(12) United States Patent
Baumann et al.

(10) Patent No.: US 7,082,363 B2
(45) Date of Patent: Jul. 25, 2006

(54) METHOD FOR MEASURING THE ROTATIONAL SPEED OF A CRANKSHAFT

(75) Inventors: Andreas Baumann, Vaihingen/Enz (DE); Thomas Wenzler, Hockenheim (DE); Pierre-Yves Crepin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/242,727

(22) Filed: Oct. 3, 2005

(65) Prior Publication Data

US 2006/0070430 A1    Apr. 6, 2006

(30) Foreign Application Priority Data

Oct. 2, 2004    (DE)    ............... 10 2004 048 133

(51) Int. Cl.
*F02D 41/00*    (2006.01)
*F02D 45/00*    (2006.01)

(52) U.S. Cl. .................. 701/115; 123/406.42

(58) Field of Classification Search ............... 701/115, 701/101, 102; 123/406.42, 406.21, 406.23
See application file for complete search history.

(56) References Cited

U.S. PATENT DOCUMENTS 5,469,823 A * 11/1995 Ott et al. ............... 123/406.62

FOREIGN PATENT DOCUMENTS

JP    5-240102 A    *    9/1993

* cited by examiner

*Primary Examiner*—Hieu T. Vo
(74) *Attorney, Agent, or Firm*—Kenyon & Kenyon LLP

(57) ABSTRACT

In a method for determining the rotational speed of the crankshaft of an internal combustion engine having a sensor disk which is connected to a crankshaft of the internal combustion engine, the sensor disk having a marking via a system of alternating teeth and tooth spaces, and a first sensor assigned to the sensor disk generating an electrical signal which is able to assume at least two signal levels, one of the signal levels being assigned to a tooth and the other being assigned to a tooth space, the accuracy of the rotational speed determination is increased in that the rotational speed of the crankshaft is determined by the control unit from the angle between two markings divided by the time elapsed between the two markings; additional markings may be situated between the two markings and the number of markings which are situated between the two markings is a function of the rotational speed.

9 Claims, 1 Drawing Sheet

Fig. 1
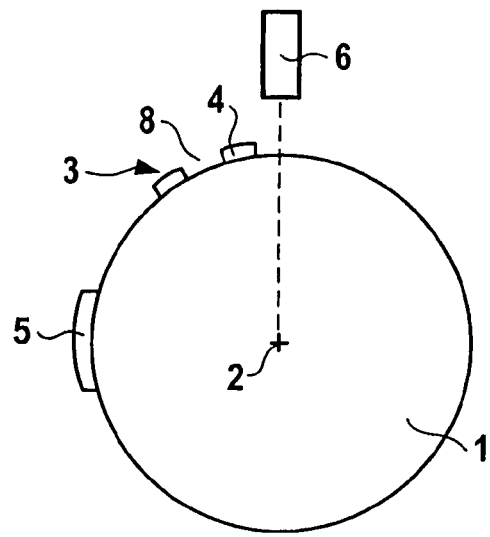
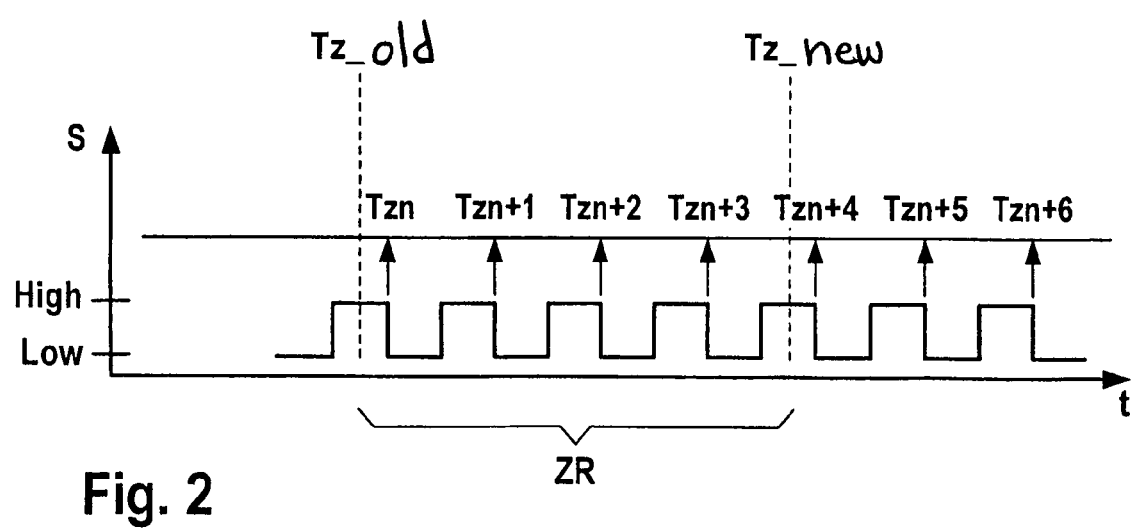
Fig. 2

METHOD FOR MEASURING THE ROTATIONAL SPEED OF A CRANKSHAFT

FIELD OF THE INVENTION

The present invention relates to a method for determining the rotational speed of the crankshaft of an internal combustion engine having a sensor disk which is connected to a crankshaft of the engine, the sensor disk having a marking via a system of alternating teeth and tooth spaces, and a sensor assigned to the sensor disk generating a signal which is able to assume two signal levels, one signal level being assigned to a tooth and the other signal level being assigned to a tooth space, as well as a control unit for carrying out the method.

BACKGROUND INFORMATION

The rotational speed for the timer processor unit (TPU) level is determined in two different ways according to the related art. First, the TPU calculates the rotational speed based on the last tooth time and second, the TPU receives a tooth time from the functional level of the control unit. The tooth time is calculated based on the segment time. In an internal combustion engine having six cylinders, for example, one segment includes 720/6 crank angles, i.e., crankshaft angles of 120°.

According to the related art, the rotational speed of the crankshaft and thus of the engine is determined between two consecutive tooth flanks. Thus, the period of time is measured which has elapsed between two consecutive tooth flanks, the crankshaft angle between consecutive tooth flanks being known. Hence, the engine speed may be directly determined.

The method according to the related art has the disadvantage that, by forming the tooth time from the segment time, considerable errors occur in the dynamics in the low rotational speed range, while, in direct tooth time analysis, the tolerances in the position and the development of the tooth flanks have a strong effect on the accuracy of the rotational speed determination at high speeds during steady-state operation.

Therefore, it is an object of the present invention to increase the accuracy of the rotational speed determination.

SUMMARY OF THE INVENTION

The above-mentioned object is achieved by a method for determining the rotational speed of the crankshaft of an internal combustion engine using a sensor disk which is connected to a crankshaft of the engine, the sensor disk having a marking via a system of alternating teeth and tooth spaces, and a sensor assigned to the sensor disk generating a signal which is able to assume two signal levels, one signal level being assigned to a tooth and the other signal level being assigned to a tooth space, in which the rotational speed of the crankshaft is determined by the control unit from the angle between two markings (n, n+m) divided by the elapsed time between the two markings ($TZ_n - TZ_{n+m}$); additional markings (m) may be situated between the two markings (n, n+m), and the number of markings which are situated between the two markings (n, n+m) is rotational speed-dependent. The rotational speed of the crankshaft is determined based on the tooth times input during a predefined time grid. The time grid of the calculation is adjusted as a function of the rotational speed. The number of tooth times which may be used for averaging the rotational speed is variable. This makes it possible to optimally adjust the calculation to two optimization targets. The effect of the angle errors of the tooth flanks is small at low rotational speeds. Averaging may thus be performed via a small number of tooth flanks, which enables a good resolution of the speed dynamics, which is high in this rotational speed range. The possible speed dynamics is substantially lower at high rotational speeds. Averaging via a greater number of tooth times is possible and eliminates the effect of angle errors of the tooth flanks. The last averaging of the tooth times, before the output tooth of the injection, takes place in the interval of a time grid at the earliest. The output tooth indicates the tooth at which the injection is triggered. The tooth times are the points in time at which the sensor measures a descending tooth flank. This averaging may be more up to date than averaging at the angle grid (synchro or second synchro). This is particularly advantageous for an injection output on end angles at the TPU (the start angle is updated here on the basis of the injection time and the rotational speed at the output tooth).

The function of averaging via a variable number of teeth is carried out on the function level in the time grid using the user layer of the control unit. This represents a resource-saving alternative to the complex approach on the TPU level. Therefore, the method according to the present invention may be implemented relatively inexpensively. A comparable implementation of the method according to the present invention on the TPU level (hardware module of the control unit) would, in contrast, require comparatively high expenditures.

According to a refinement of the method according to the present invention, the number of markings situated between the two markings increases with increasing rotational speed. At a low rotational speed, the error is dominating due to the dynamics, thereby making weak averaging in this range necessary. At a high rotational speed, the dynamic effect is weakened, while the tolerances of the sensor wheel (sensor disk) gain in importance. Therefore, averaging based on a larger number of teeth is sensible in this range.

According to a refinement of the method according to the present invention, the (n+m)th marking lies at least one marking before the marking which marks an injection of a cylinder of the internal combustion engine. The latter marking is also referred to as an output tooth. The rotational speed is thus not updated until shortly before triggering of the injection, so that the injection takes place using parameters which are optimally adjusted to the speed of the internal combustion engine.

In a refinement of the method according to the present invention, the time and a marking number of the nth marking is stored in a first memory cell of the control unit. In a refinement, the time and a marking number of the (n+m)th marking may be stored in a second memory cell of the control unit; in a further embodiment of the method, the content of the first memory cell is overwritten by the content of the second memory cell after calculation of the rotational speed. This measure optimizes the use of resources for carrying out the method.

In a refinement of the method according to the present invention, the markings are tooth flanks of the sensor disk and the sensor measures the tooth flanks inductively, capacitively, or via the Hall effect.

The tooth flanks are preferably essentially uniformly distributed over the sensor disk; a zero marking, e.g., in the form of a double-width tooth or a double-width tooth space (i.e., one tooth or one tooth space is omitted) is additionally situated on the sensor disk.

The above-mentioned object is also achieved by a control unit having an executable control program which is able to execute the method according to the present invention.

BRIEF DESCRIPTION OF THE DRAWINGS

FIG. 1 shows a schematic system of the sensors and the sensor disk.

FIG. 2 shows a schematic representation of the signal curve of the sensors over time.

DETAILED DESCRIPTION

FIG. 1 shows a diagram of a sensor disk 1 which, for example, is situated directly on a crankshaft or a camshaft or is indirectly connected to the crankshaft or camshaft via transmission elements with regard to the rotation. Sensor disk 1 rotates around an axis 2. Markings 3 are situated on the outer circumference of sensor disk 1. The markings are composed of teeth 4, for example, which are each situated equidistant over the outer circumference of sensor disk 1. Tooth spaces 8 are situated between teeth 4. An additional marking 5, e.g., as shown here in the form of a double-width tooth 4 or in form of a larger tooth space between teeth 4 or the like, marks a designated zero position of the crankshaft or camshaft. A sensor 6 is situated on sensor disk 1.

During a rotation of the camshaft and thus sensor disk 1, teeth 4 and marking 5 are moved past sensor 6, thereby triggering an electrical signal in sensor 6, for example. Sensor 6 may be an inductive, a capacitive, or a Hall effect-based sensor. This sensor may alternatively also operate optically, e.g., in that it may measure optical changes caused by teeth 4 or marking 5.

FIG. 2 shows the signal curve of output signal S of sensor 6 over time t. The alternating passage of teeth 4 and tooth spaces 8 generates a rectangular-shaped signal in the signal curve of sensor 6 which may assume a value "high" as well as a value "low." Between both values, the signal changes abruptly with an ascending and a descending flank. The normal resolution of the angle is a crankshaft angle of 6° (KW), and using a space of two angle units, 58 tooth pairs or pole pairs are applied to the sensor disk.

The rotational speed is determined in such a way that each time identical flanks are determined, in this case, for example, each descending flank. One tooth flank of sensor disk 1 may be uniquely assigned to each of the flanks by counting from the zero marking. Starting with a flank Tzn, to which tooth Zn is assigned, the subsequent flanks are labeled Tzn+1, Tzn+2, and so forth. The sensor disk has been rotated by 6° between two consecutive descending flanks. Rotational speed nmot of the sensor disk and thus of the crankshaft is $$nmot[1/mn]=(Zn-Zn+m)\times \text{tooth angle}[°]/(TZn[ms]-TZn+m[ms])\times(1/0.006[°xmn/ms]).$$

Factor 1/0.006 [°xmn/ms] is used for converting the values measured in milliseconds into a rotational speed unit in 1/minutes. Here, Nmot indicates the engine speed which is equal to the crankshaft rotational speed or the rotational speed of the sensor disk.

Zn indicates the nth descending signal flank (n is an integer).

Zn+m indicates the (n+m)th descending signal flank (m is an integer). Thus, counting continues from the Znth signal flank for m signal flanks.

TZn indicates the time at which the Znth signal flank is measured.

TZn+m indicates the time at which the Zn+mth signal flank is measured.

[ ] indicates the units in which the physical variables are measured, e.g., [°]=degrees, [ms]=milliseconds, [nm]=minutes, etc.

The times of the negative flanks are determined on the timer processor unit (TPU) level from the signals provided by the rotational speed sensor and stored temporarily in a RAM cell, the signals being indicated in FIG. 2 as vertical arrows. The tooth number is additionally recorded. This cell is read via the user layer on each time grid ZR, these being indicated in FIG. 2 by a dashed line. Time and designation of the last tooth read are thus known. The average rotational speed is calculated on the user layer. Time TZ_old and tooth number ZN_old of the flank before the last time grid are stored. The instantaneous values TZ_new and ZN_new are input. This results in the following formula for the rotational speed:

$$NMOT=(ZN\_\text{new}-ZN\_\text{old})\times \text{tooth angle}/(TZ\_\text{new}-TZ\_\text{old})\times(1/0.006[°xmn/ms])$$

The rotational speed is fed back to the TPU. It is valid until the next time grid. The new values finally overwrite the old values TZ_old and ZN_old.

What is claimed is:

1. A control unit including an executable control program which executes a method for determining a rotational speed of a crankshaft of an internal combustion engine having a sensor disk which is connected to the crankshaft of the internal combustion engine, the sensor disk having markings via a system of alternating teeth and tooth spaces, the method comprising:

with a first sensor assigned to the sensor disk, generating an electrical signal which is able to assume at least two signal levels, one of the signal levels being assigned to a tooth and another of the signal levels being assigned to a tooth space; and determining the rotational speed of the crankshaft with a control unit from an angle between two markings on the sensor disk divided by a time elapsed between the two markings, wherein a number of additional markings are situated between the two markings, the number of additional markings being a function of the rotational speed.

2. A method for determining a rotational speed of a crankshaft of an internal combustion engine having a sensor disk which is connected to the crankshaft of the internal combustion engine, the sensor disk having markings via a system of alternating teeth and tooth spaces, the method comprising:

with a first sensor assigned to the sensor disk, generating an electrical signal which is able to assume at least two signal levels, one of the signal levels being assigned to a tooth and another of the signal levels being assigned to a tooth space; and determining the rotational speed of the crankshaft with a control unit from an angle between two markings on the sensor disk divided by a time elapsed between the two markings, wherein a number of additional markings are situated between the two markings, the number of additional markings being a function of the rotational speed.

3. The method according to claim 2, wherein the number of markings situated between the two markings increases with increasing rotational speed.

4. The method according to claim 2, wherein one of the markings is situated at least one marking before a marking which marks an injection of a cylinder of the internal combustion engine.

5. The method according to claim 2, further comprising storing a time and a marking number of a first of the markings in a first memory cell of the control unit.

6. The method according to claim 5, further comprising storing a time and a marking number of a second of the markings in a second memory cell of the control unit.

7. The method according to claim 6, wherein, after calculation of the rotational speed, a content of the second memory cell overwrites a content of the first memory cell.

8. The method according to claim 1, wherein the markings are tooth flanks of the sensor disk and the sensor measures the tooth flanks one of (a) inductively, (b) capacitively, and (c) via the Hall effect.

9. The method according to claim 8, wherein the tooth flanks are substantially uniformly distributed over the sensor disk, a zero marking being additionally situated on the sensor disk.

\* \* \* \* \*

UNITED STATES PATENT AND TRADEMARK OFFICE
CERTIFICATE OF CORRECTION

PATENT NO. : 7,082,363 B2
APPLICATION NO. : 11/242727
DATED : July 25, 2006
INVENTOR(S) : Andreas Baumann et al.

It is certified that error appears in the above-identified patent and that said Letters Patent is hereby corrected as shown below:

Column 6, line 4, change "claim 1, wherein" to --claim 2, wherein--

Signed and Sealed this

Thirtieth Day of October, 2007

JON W. DUDAS
*Director of the United States Patent and Trademark Office*